United States Patent Office 3,137,731
Patented June 16, 1964

3,137,731
PROCESS FOR PREPARING SUBSTITUTED CYCLOPENTENONES
Julius L. E. Erickson, Baton Rouge, La., and Julian Dorsky, Rockaway, and William M. Easter, Jr., Hasbrouck Heights, N.J., assignors to The Givaudan Corporation, New York, N.Y., a corporation of New Jersey
No Drawing. Filed Jan. 26, 1962, Ser. No. 169,121
6 Claims. (Cl. 260—586)

The present invention deals with a process for preparing alkyl-, aryl-, aralkyl-, and cycloaliphatic-substituted cyclopentenones and to certain novel products obtained thereby.

The principal starting materials employed in accordance with this invention, and the resulting products, may be represented in the following way:

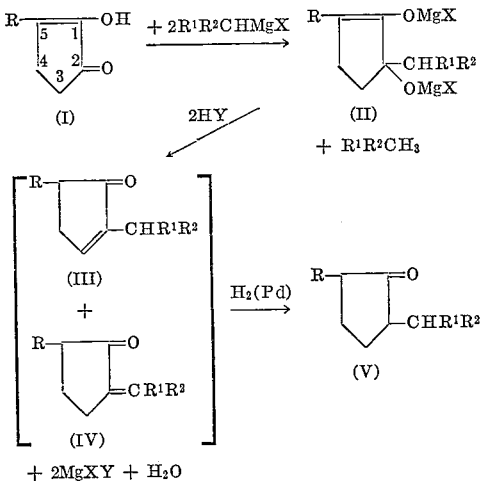

+ 2MgXY + H$_2$O wherein R is H or methyl; $R^1$ and $R^2$ may be the same or different and are selected from the group consisting of hydrogen, aryl radicals and saturated or unsaturated alkyl, aralkyl and cycloalkyl radicals; X is a member selected from the group consisting of chlorine, bromine and iodine; and Y is an acid anion.

In addition to the Grignard reagents encompassed by the designation, $R^1R^2$CHMgX, Grignards such as $$R^1R^2R^3\text{CMgX}$$

e.g. tertiary-butyl magnesium halide, may be used. $R^3$ has the same significance as $R^1$ and $R^2$. Also, aryl Grignards, in which the magnesium is connected to a nuclear carbon atom, such as phenyl magnesium halide, may be used. In both of the cases mentioned in this paragraph the reaction will proceed as indicated in the above reaction sequence, except for the fact that the product designated as (IV) does not form. The designation $R^4$ is intended to include all operable Grignards selected from the group consisting of alkyl Grignards, aryl Grignards, aralkyl Grignards and cyclo-aliphatic Grignards.

In general, the process of this invention is conducted by carrying out the first stage, i.e., the Grignard reaction, in the presence of a solvent at an elevated temperature, e.g., refluxing temperature, then hydrolyzing the intermediate reaction product (II) with an acid at a low temperature, e.g. with ice, and then recovering the desired product (III+IV) or (III) alone, by conventional recovery procedures.

As illustrative of the reactants, reagents, and solvents which may be used in accordance with this invention the following are mentioned:

The starting materials (I) may be those wherein R in the foregoing formula is hydrogen or methyl. These starting materials are the enol forms of α diketones.

It is, therefore, understood that wherever the context of the specification and/or claims so admits or requires, the recitation of the enol is to be taken as including the corresponding ethers and metal salts.

Grignard reagents, $R^4$MgX, include alkyl Grignards, such as methyl magnesium chloride, isopropyl magnesium chloride, n-butyl magnesium chloride, tertiary-butyl magnesium chloride, n-pentyl magnesium chloride and dodecyl magnesium chloride; aryl Grignards such as phenyl magnesium chloride, methyl phenyl magnesium chloride, ethyl phenyl magnesium chloride, isopropyl phenyl magnesium chloride and dimethyl phenyl magnesium chloride; aralkyl Grignards such as benzyl magnesium chloride, methyl benzyl magnesium chloride, ethyl benzyl magnesium chloride, isopropyl benzyl magnesium chloride, t.-butyl benzyl magnesium chloride and dimethyl benzyl magnesium chloride; and cycloalkyl Grignards, such as cyclohexyl magnesium chloride, methyl cyclohexyl magnesium chloride, ethyl cyclohexyl magnesium chloride, isopropyl cyclohexyl magnesium chloride, t.-butyl cyclohexyl magnesium chloride, dimethyl cyclohexyl magnesium chloride and methyl isopropyl cyclohexyl magnesium chloride.

In place of the aforementioned chlorides, the corresponding bromides and iodies can be used.

The acid, HY, employed to hydrolyze the intermediate Grignard reaction product (II) may be hydrochloric acid, or other acids or acidic salts known to be effective in decomposing Grignard reaction products.

The reaction of (I) with the Grignard reagent is conducted in the presence of a suitable solvent, usually diethyl ether but other suitable solvents such as dibutyl ether or benzene may be used.

If desired, catalysts may be used in conducting the reaction with the Grignard reagent. Dimethylaniline is an example of a catalyst which may be used.

In addition to the excellent yields obtainable in accordance with the present invention, it has other desirable features. One is the relatively low cost when 5-methylcyclopent-5-en-1-ol-2-one is used. Another feature is that it permits the synthesis of a large number of substituted cyclopentenones.

EXAMPLE 1

Preparation of 2-n-Amyl-5-Methylcyclopent-2-En-1-One and 2-Amylidene-5-Methylcyclopentanone, Isomers of Dihydrojasmone

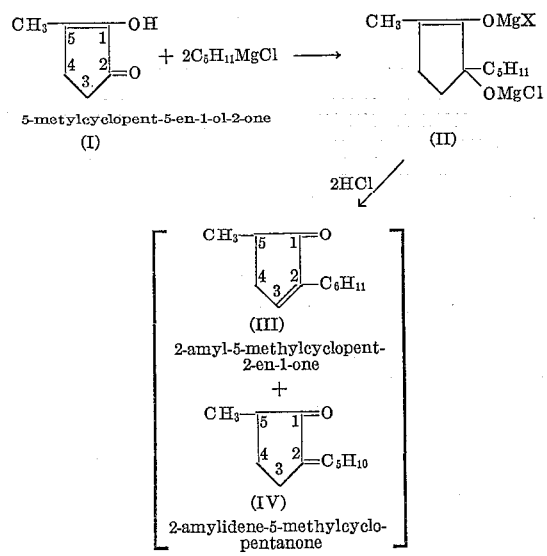

(a) To an ethereal solution of n-amylmagnesium chloride, prepared from 128 g. (1.20 moles) of n-amyl chloride and 26.7 g. (1.10 atoms) of magnesium, was added in three portions over a period of 15 minutes 44.8 g. (0.40 mole) of powdered, anhydrous 5-methylcyclopent-5-en-1-ol-2-one, M.P. 105–106°. After the vigorous reaction had subsided, the reaction mixture was refluxed for 1.5 hr. and allowed to stand overnight. It was then poured into a stirred mixture of crushed ice and 200 ml. of concentrated hydrochloric acid. The ethereal solution was separated, and washed successively with small quantities of water, 1% sodium hydroxide solution, and again with water, and was dried over anhydrous calcium chloride. The ethereal solution was concentrated by evaporation and distilled to yield 49 g. (74% yield) of a colorless, odorous oil, B.P. 85–86° (4 mm.), and 10 g. of a residue which was not examined. The ferric chloride color test for enols was negative, indicating that the product was not contaminated with traces of the starting material. Refractionation through a 10-inch, vacuum-jacketed, packed column gave 46 g. of product, B.P. 75.5–76° (2 mm.), $n_D^{20}$ 1.4674, $d_4^{20}$ 0.9022.

This product was shown by vapor phase chromatographic analysis (Barber-Colman, Model 20, Chromatograph, 200-ft. Apiezon column) to be a binary mixture of compounds with a percentage composition, 51.7% and 48.3%.

The principal infrared absorption frequencies are: unsaturated aliphatic C—H stretching, 3.32; α,β-unsaturated C=O, 5.87; C=C stretching, 6.10μ. These data are in harmony with the expected isomeric products, 2-n-amyl-5-methylcyclopent-2-en-1-one and 2-amylidene-5-methylcyclopentanone, which are isomers of dihydrojasmone.

(b) Catalytic hydrogenation of 5 g. of the binary mixture in anhydrous methanol, using a palladium-charcoal catalyst, required the calculated amount of hydrogen, and gave 4.4 g. of a liquid, B.P. 65–67° (2 mm.), $n_D^{20}$ 1.4453, whose infrared spectra was entirely free of the absorption bands showing unsaturation at 3.32 and 6.10μ, which were present in the binary mixture. This liquid was shown to be a pure compound by vapor phase chromatography, and corresponds to the structure, 2-n-amyl-5-methylcyclopentanone, which is an isomer of tetrahydrojasmone and hexahydropyrethrone.

In similar manner, 5-methylcyclopent-5-en-1-ol-2-one and the appropriate Grignard reagent ($R^4$MgX) were used to prepare compounds in which R was $CH_3$ and $R^4$ was as indicated in the table below. The final products had the properties and were obtained in the yields given in the table:

| $R^4$ | B.P.,°C./mm. | $n_D^{20}$ | $d_{25}^{25}$ | Weight yield,[1] grams |
|---|---|---|---|---|
| Methyl | 47/11 | 1.4656 | | 8.9 |
| tert-Butyl | 83/9 | 1.4624 | | 41.1 |
| n-Butyl | 63/1 | 1.4675 | 0.9091 | 67.0 |
| Dodecyl | 165/1 | 1.4660 | 0.8737 | 111.8 |
| Isopropyl | 85/10 | 1.4620 | | 29.0 |
| n-Pentyl | 79/1.5 | 1.4668 | 0.9015 | 105.0 |

[1] On 100 g. of 5-methylcyclopent-5-en-1-ol-2-one charged.

EXAMPLE 2

*Preparation of 2-Benzyl-5-Methylcyclopent-2-En-1-One*

Benzyl Grignard reagent was prepared by adding benzyl chloride (139 g.) to magnesium turnings (30 g.) in ether (340 g.) over four hours. There was added to the Grignard reagent 44.8 g. of 5-methylcyclopent-5-en-1-ol-2-one over 15 minutes, the mixture was refluxed for 1½ hours and then allowed to stand overnight.

In the morning it was quenched in a mixture of 500 g. ice and 200 cc. of 31% muriatic acid and agitated for two hours. The ether layer was separated, washed with 200 cc. of water, then with 2 cc. of 1% sodium hydroxide and finally neutral with water.

After distilling off the ether to a pot temperature of 7° C. the product was vacuum distilled at 1.5 mm. The following cuts were collected:

| Cut No. | Vapor, °C. | Grams |
|---|---|---|
| 1 | 80–117 | 1.5 |
| 2 | 118 | 1.5 |
| 3 | 125 | 40.0 |
| Residue | | 16.0 |

Cut #3 was 2-benzyl-5-methylcyclopent-2-en-1-one and had the following physical properties:

Sp. Gr., 25°/25° C. _____ 1.0392
$n_D^{20}$ _____ 1.5552
Trace of alcohol by infrared.

In similar manner the corresponding 2-phenyl and 2-cyclohexyl compounds were made by using phenyl magnesium chloride or cyclohexyl magnesium chloride, respectively, in place of benzyl magnesium chloride.

The 2-phenyl-5-methylcyclopent-2-en-1-one which was obtained boiled at 130° C. under a pressure of 3.5 mm. of mercury, had an index of refraction, $n_D^{20}$, of 1.5679, and a density, $d_{25}^{25}$, of 1.0696. It was obtained in a weight yield of 80.5, based on 100 g. of the starting cyclopentene derivative.

The 2-cyclohexyl-5-methylcyclopent-2-en-1-one which was obtained boiled at 102° C. under a pressure of 2 mm. of mercury, had an index of refraction, $n_D^{20}$, of 1.4971, and a density, $d_{25}^{25}$, of 0.9702. It was obtained in a weight yield of 58.0.

All of the products made in accordance with this invention possess desirable olfactory properties, making them useful in perfumery.

This application is a continuation-in-part of applicants' co-pending applications, Serial Numbers 774,827 and 774,843, filed November 19, 1958, both now abandoned. Nuclear Magnetic Resonance spectra have shown that the starting enol (I) disclosed in said applications has the formula, 5-methylcyclopent-5-en-1-ol-2-one and not 5-methylcyclopent-2-en-2-ol-1-one, as stated in said applications.

While the invention has been described in detail as to method and products, it is understood that changes may be made pertaining to both, and hence no limitations on the invention are intended other than those imposed by the scope of the appended claims, construed as broadly as permissible in view of the prior art.

What is claimed is:

1. The process for preparing substituted cyclopentenones which comprises heating, in the presence of a solvent and at a temperature up to reflux temperature, a material having the formula;

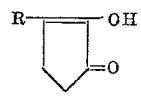

where R is selected from the group consisting of H and $CH_3$, with a Grignard reagent, $R^4$MgX, where $R^4$ is a member selected from the group consisting of an alkyl radical, a mononuclear aryl hydrocarbon radical, a mononuclear aralkyl hydrocarbon radical, a cycloalkyl radical and a lower-alkyl-substituted cycloalkyl radical and X is a member selected from the group consisting of chlorine, bromine and iodine, and recovering the desired product.

2. The process of claim 1, wherein 5-methylcyclopent-5-en-1-ol-2-one is the starting material.

3. The process of claim 2, wherein n-amyl magnesium chloride is the Grignard reagent.

4. The process of claim 2, wherein benzyl magnesium chloride is the Grignard reagent.

5. The process of claim 2, wherein phenyl magnesium chloride is the Grignard reagent.

6. The process of claim 2, wherein cyclohexyl magnesium chloride is the Grignard reagent.

References Cited in the file of this patent

UNITED STATES PATENTS 2,069,861    St. Pfau _____ Feb. 9, 1937

OTHER REFERENCES

Woods et al.: J. Am. Chem. Soc., vol 70, page 2174 (1948).

Woods et al.: J. Am. Chem. Soc., vol. 71, pages 2028–31 (1949).

UNITED STATES PATENT OFFICE
CERTIFICATE OF CORRECTION

Patent No. 3,137,731                                   June 16, 1964

Julius L. E. Erickson et al.

It is hereby certified that error appears in the above numbered patent requiring correction and that the said Letters Patent should read as corrected below.

Column 1, line 24, for "+$R^1R^2CH_3$" read -- +$R^1R^2CH_2$ --; column 2, line 54, for "5-metylcyclopent-5-en-1-ol-2-one" read -- 5-methylcyclopent-5-en-1-ol-2-one --; same column 2, formula (III) should appear as shown below instead of as in the patent:

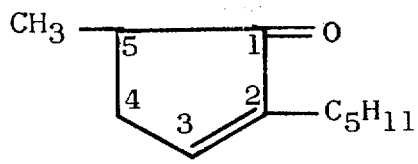

column 4, line 2, for "2cc." read -- 200 cc. --; line 5, for "7° C." read -- 70° C. --.

Signed and sealed this 1st day of December 1964.

(SEAL)
Attest:

ERNEST W. SWIDER                                  EDWARD J. BRENNER
Attesting Officer                                   Commissioner of Patents